United States Patent [19]

Letoffe

[11] Patent Number: 4,755,579
[45] Date of Patent: Jul. 5, 1988

[54] AUTOACCELERATED ORGANOPOLYSILOXANE ELASTOMERS

[75] Inventor: Michel Letoffe, Sainte-Foy les Lyon, France

[73] Assignee: Rhone-Poulenc Specialites Chimiques, Courbevoie, France

[21] Appl. No.: 62,623

[22] Filed: Jun. 16, 1987

Related U.S. Application Data

[63] Continuation of Ser. No. 859,996, May 5, 1986, abandoned.

[30] Foreign Application Priority Data

May 3, 1985 [FR] France ................... 85 06735

[51] Int. Cl.$^4$ ............................................. C08G 77/06
[52] U.S. Cl. ........................................ 528/21; 528/14;
528/17; 528/18; 528/34; 428/447; 524/315;
524/356; 524/464; 524/588; 524/860
[58] Field of Search ............... 528/21, 14, 34, 18,
528/17; 428/447; 524/464, 588, 315, 356, 860

[56] References Cited

U.S. PATENT DOCUMENTS

| | | | |
|---|---|---|---|
| 3,133,891 | 5/1964 | Ceyzeriat | 528/34 |
| 3,240,731 | 3/1966 | Nitzsche et al. | 528/34 |
| 3,382,205 | 5/1968 | Beers | 528/34 |
| 4,356,116 | 10/1982 | Beers | 528/34 |
| 4,357,438 | 11/1982 | Sattlegger et al. | 524/490 |
| 4,460,740 | 7/1984 | Arai | 524/724 |
| 4,532,315 | 7/1985 | Letoffe et al. | 528/34 |

Primary Examiner—Melvyn I. Marquis
Attorney, Agent, or Firm—Burns, Doane, Swecker & Mathis

[57] ABSTRACT

Organopolysiloxane compositions comprising a polyhydroxylated polysiloxane and a polyacyloxysilane, whether in single- or two-component form, rapidly cure into elastomeric state (and are thus useful, e.g., as sealing materials) in the presence of a 2-carboxycarboxamide cure autoaccelerator.

18 Claims, No Drawings

AUTOACCELERATED ORGANOPOLYSILOXANE ELASTOMERS

This application is a continuation of application Ser. No. 859,996, field May 5, 1986, now abandoned.

BACKGROUND OF THE INVENTION

1. Field of the Invention

The present invention relates to organopolysiloxane compositions containing polyacyloxysilanes which cure very quickly into elastomeric state, when heated in the presence of an accelerator containing a 2-carboxycarboxamide group.

The compositions of the invention are members of the group of silicone elastomer compositions designated as "autoaccelerated cure".

2. Description of the Prior Art

Most of the autoaccelerated compositions known to this art are of the two-component (two-pack) type.

In contrast to the known single-component compositions which are cured by atmospheric moisture and which also bear acyloxy radicals bonded to silicon atoms (described, in particular, in French Pat. Nos. 1,198,749, 1,220,348, 2,429,811 and published French Patent Application No. 82/13,505; filed July 30, 1982), these compositions are not stable in storage, but their cross-linking time is much shorter, for example, on the order of a few minutes and up to 60 minutes. These known autoaccelerated compositions must therefore be prepared at the point in time of actual use.

The compositions of the above type, which have a short cross-linking time, such cross-linking being independent of the moisture content of the surrounding atmosphere, are used for those applications in which this property is especially advantageous, such as, for example, the manufacture of "in situ" seals in the automotive industry. Compositions of the above-mentioned type, bearing acyloxy radicals bonded to silicon atoms, whose cross-linking time is dependent of the moisture in the surrounding air, are known from French Pat. No. 1,193,721, in which the accelerator is zinc oxide, and from British Pat. No. 1,308,985, which '985 patent describes a curing process consisting of adding to the compositions 3 to 15% of a silicoaluminate cure accelerator containing from 5 to 10% by weight of absorbed water, in order to manufacture molded articles of a silicone elastomer by low-pressure injection molding.

Published French Patent Applications Nos. 2,540,128 and 2,540,129, filed Jan. 27, 1983, also describe compositions of this type, but in which the cure accelerator is selected, respectively, from an alkali metal and alkaline earth metal hydroxide, or from a mixture consisting of water and an alkali or alkaline earth metal phosphate and/or polyphosphate.

The accelerators described in both of these French applications mark a noted advance in this art relative to the teachings of French Pat. No. 1,193,721 and British Pat. No. 1,308,985, in the sense that, on the one hand, the nature and the amounts of accelerators which are added do not detract from the mechanical properties of the elastomer produced, especially with regard to residual compression set (RCS) and, on the other hand, these accelerators have made it possible to use such compositions for the bonding and sealing of components traveling on industrial assembly lines or those for which there are no available storage areas that would ensure their complete cure.

However, the compositions described in these patents cannot be produced in single-pack (single-component) form and must be packaged as two components: generally, on the one hand, the organopolysiloxane component and, on the other hand, the accelerator, because the mixture of these components must be made ad hoc, that is to say, at the point in time of actual use.

This procedure has disadvantages. First of all, there is of course a risk that the two components may not be measured out correctly at the time of use. In addition, especially in the case of the automatic production of "shaped" or "in situ" seals, the mixture is produced in a complex and costly automatic device for applying the compositions, which has a mixer head receiving the polysiloxane composition and the accelerator. The compositions used in this apparatus must then have a curing time which is properly adjusted to avoid setting in the mixer head, and this requires meticulous, time-consuming development. Furthermore, these mixer heads must be emptied in the event of a stoppage or a breakdown of the apparatus, to avoid setting.

A solution has been provided in published French Patent Application No. 2,553,784, which makes it possible to obtain single-component, autoaccelerated compositions which are stable in storage at ambient temperature in the absence of atmospheric moisture, by microencapsulating the accelerator. This microencapsulation is completely effective, but increases the cost of the compositions due to the additional microencapsulation step.

SUMMARY OF THE INVENTION

Accordingly, a major object of the present invention is the provision of improved organopolysiloxane compositions which can be single-component, and which do not possess the above-mentioned disadvantages and drawbacks of the prior art compositions. Another object of the invention is the provision of a novel cure accelerator which, when incorporated into the subject organopolysiloxane compositions, does not cause the compositions to cure at ambient temperature in the absence of atmospheric moisture, but efficiently accelerates the curing of the compositions via the application of energy thereto, particularly by exposure to heat.

Briefly, the present invention features an organopolysiloxane composition capable of cross-linking into an elastomer and comprising a polyhydroxylated polysiloxane (A), a polyacyloxysilane (B) and an effective amount of a cure accelerator (C) which comprises at least one organic compound containing at least one 2-carboxycarboxamide group, optionally converted into salt form by means of a metal cation, preferably an alkali metal or an alkaline earth metal cation.

DETAILED DESCRIPTION OF THE PREFERRED EMBODIMENTS OF THE INVENTION

More particularly according to the present invention, the accelerator (C) advantageously has the general formula (I):

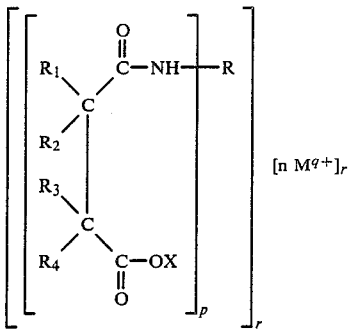

wherein $R_1$, $R_2$, $R_3$ and $R_4$ are each a hydrogen atom, a halogen atom, an alkyl or haloalkyl, alkoxy, alkoxycarbonyl, hydroxyl, carbamoyl or carboxamide radical, with the proviso that $R_1$ and/or $R_2$ may together form, with $R_3$ and/or $R_4$, a valence bond and/or a divalent radical (L) including the two carbon atoms to which $R_1$ (or $R_2$) and $R_3$ (or $R_4$) are attached, said radical (L) optionally comprising another 2-carboxycarboxamide group, and said radical (L) being cyclic or polycyclic, cyclic, or alternatively consisting of a number of several cyclic groups joined together by a valence bond, a heteroatom, or a methylene or carboxyl group;

r is an integer equal to 1 or 2;

p is an integer equal to 1 or 2 and denoting the valency of the symbol R;

R is a valence bond or one of the following radicals;

(a) a monovalent radical consisting of a hydrogen atom; a —CONHR$_5$ group; a —CSNHR$_5$ group, with R$_5$ being a hydrogen atom or an alkyl radical; an aliphatic or saturated or unsaturated alicyclic radical; an aromatic radical; these various radicals being optionally substituted by alkyl groups, themselves optionally halogenated, by halogen atoms, by carboxylic or nitro groups, or also by urea, thiourea or hydroxy groups;

(b) a divalent alkylene, cycloalkylene or phenylene radical, or a plurality of alkylene or phenylene groups bonded together by a heteroatom or a

group, with R$_5$ being a hydrogen atom or an alkyl group;

M is a cation of valency q, preferably an alkali metal or alkaline earth metal cation; and n is an integer equal to 0, 1 or 2, and such that the overall ionic charge of the accelerator is zero (n×q=p) when n=0; X denotes the hydrogen atom and when n is other than 0, X denotes a negative charge.

The accelerator is preferably a derivative of a phthalamic acid, a maleamic acid, a succinamic acid or a polyhydrophthalic acid. Obviously, these various accelerators may be mixed together and may, furthermore, comprise any substituent which has no detrimental effect on the physicochemical properties of the cured elastomer. These various substituents may be borne by the radicals (L) or (R).

In the formula (I), the various symbols preferably denote:

$R_1$, $R_2$, $R_3$, $R_4$: a hydrogen atom, a chlorine atom, an alkyl or alkoxy group containing from 1 to 4 carbon atoms, two of the groups $R_1$, $R_2$, $R_3$, $R_4$ being hydrogen atoms, the groups $R_1$ and/or $R_2$ being capable of forming with the groups $R_3$ and/or $R_4$ a valence bond and/or a divalent radical (L) including the two carbon atoms to which the groups $R_1$ (or $R_2$) and $R_3$ (or $R_4$) are attached, said radical (L) optionally comprising another 2-carboxycarboxamide group, and said radical (L) being selected from among the following cyclic or polycyclic groups:

(i) a saturated or unsaturated alicyclic radical containing from 4 to 6 ring carbon atoms and optionally substituted by alkyl groups, halogen atoms or COOH or NO$_2$ groups, (ii) a phenyl or naphthalenic radical, optionally substituted by alkyl groups, halogen atoms or COOH or NO$_2$ groups, (iii) a saturated or unsaturated or aromatic heterocyclic group containing 4 to 6 atoms in the ring and including one heteroatom, (iv) a polycyclic, saturated or unsaturated alicyclic or heterocyclic radical containing from 4 to 11 atoms, (v) a pair of saturated or unsaturated alicyclic groups containing from 4 to 6 ring carbon atoms, or phenyl, and joined together by a valence bond, an oxygen atom, an NH group or a carbonyl group; and R is a valence bond or one of the following radicals:

(a) a monovalent radical consisting of a hydrogen atom, a —CONH$_2$ or CSNH$_2$ group; an alkyl or alkenyl radical containing from 1 to 4 carbon atoms and optionally substituted by halogen atoms or by alkyl radicals, themselves optionally halogenated, a cyclohexyl or cyclopentyl radical;

(b) a divalent radical: alkylene containing at most 6 carbon atoms, cyclohexylene, cyclopentylene, phenylene, 2 to 10 alkylene groups containing at most 6 carbon atoms, or phenylene, and joined together by —O—, —NH—, or

M is an alkali or alkaline earth metal cation or a quaternary tetraalkylammonium cation, each alkyl group containing from 1 to 8 carbon atoms.

Even more preferably, the accelerator of the present invention corresponds to the formula (I), in which the various symbols denote:

$R_1$, R, $R_3$, $R_4$: a hydrogen atom, a chlorine atom, a methyl or methoxy group, two of the groups $R_1$, $R_2$, $R_3$ and $R_4$ consisting of hydrogen atoms; the groups $R_1$ and/or $R_2$ being capable of forming with the groups $R_3$ and/or $R_4$ a valence bond and/or a divalent radical (L) including the two carbon atoms to which the groups $R_1$ (or $R_2$) and $R_3$ (or $R_4$) are attached, said radical (L) optionally comprising a 2-carboxycarboxamine group, and said radical (L) being selected from among the following cyclic or polycyclic groups:

(i) a saturated or unsaturated alicyclic radical containing from 4 to 6 ring carbon atoms and optionally substituted by a methyl radical, chlorine atoms, or COOH or NO$_2$ groups, (ii) a phenyl group optionally substituted by a methyl radical, chlorine atoms, or COOH or NO$_2$ groups, (iii) a saturated or unsaturated heterocyclic group containing 4 to 6 carbon atoms in the ring and including an oxygen or nitrogen heteroatom, (iv) a polycyclic, saturated or unsaturated alicyclic or heterocyclic radical containing from 4 to 11 atoms optionally including an oxygen or nitrogen heteroatom, (v) a pair of phenyl groups joined together by a valence bond, an oxygen atom, an NH group or a carbonyl group;

R: a valence bond or one of the following radicals:

(a) a monovalent radical consisting of a hydrogen atom, a $CONH_2$ group, an alkyl radical containing from 1 to 4 carbon atoms; a phenyl radical optionally substituted by halogen atoms or by methyl radicals, themselves optionally halogenated; a cyclohexyl or cyclopentyl radical, (b) a divalent alkylene radical containing at most 6 carbon atoms, cyclopentylene, cyclohexylene, phenylene, 2 to 5 alkylene groups containing at most 6 carbon atoms and joined together by an oxygen atom, or an —NH or

group.

Lastly, calcium, lithium, barium and strontium salts are especially representative of the series of compounds containing 2-carboxycarboxamide groups introduced generally, or in a preferred and advantageous manner.

As above outlined, the accelerators according to the invention are preferably derivatives of phthalamic, polyhydrophthalamic, succinamic or maleamic acids. Furthermore, these various compounds may be represented by one of the following formulae, depending upon the valency of R and the valency of the cation M,

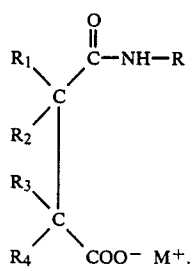

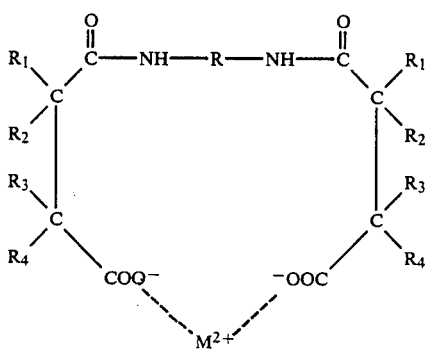

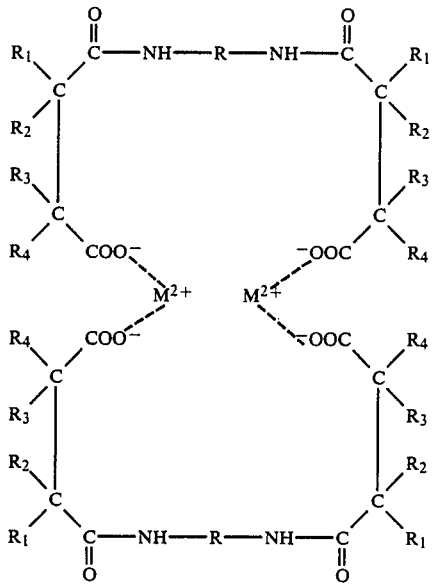

The accelerators which are especially suitable are N,N'-ethylenebismaleamic acid and calcium salt thereof, and N,N'-ethylenebissuccinamic acid and the anhydrous or monohydrated calcium salt thereof.

The various accelerators which are useful according to the present invention may be readily prepared in accordance with the known methods of the prior art, for example, by the reaction of the corresponding amino compounds with acid anhydrides, followed by salt formation. For specific reference to such process, see *Journal of the Chemical Society*, 127, p. 1791 (1925).

It will also be appreciated that the very nature of the various substituents implies not only the use of β-diacids, but also of tri- or tetraacids. Thus, for example, bis-β-diacids, such as 1,2,4,5-cyclopentanetetracarboxylic acid, provide direct access to an accelerator containing two 2-carboxycarboxamide groups.

The accelerators accoding to the invention may comprise a mixture of compounds of the 2-carboxycarboxamide type of formula I in which the carboxylic groups are free or in salt form. It is obvious that such mixtures may be obtained directly from the preparation of the accelerators according to the invention.

The various diacids (or polyacids) which can be used to prepare the accelerators may be succinic, maleamic, phthalic, dihydrophthalic, tetrahydrophthalic or hexahydrophthalic acids, or also polycyclic, optionally heterocyclic, diacids, such as derivatives of bicyclo-[2,2,2]octane, bicyclo[2,2,1]heptane, 7-azabicyclo-[2,2,1]heptane or 7-oxabicyclo[2,2,1]heptane. These various acids, which may contain various substituents, including another 2-carboxycarboxamide group, and which have been defined above, are, for example, described in the literature and, in particular in standard chemical texts, or also in:

Rodd's, *Chemistry of Carbon Compounds*, second edition:
    vol. I part D, chapter 17: Aliphatic dicarboxylic acids,
    vol. II part A and B: Alicyclic compounds,
    vol. III part E: Phthalic acids,
    vol. IV part A and F: Heterocyclic compounds, or in the well-known encyclopaedia:

Beilstein's, *Handbuch der Organischen Chemie.*

Purely by way of illustration, the following compounds are illustrative of the diacids (or their anhydrides) or of the polyacids which are useful:

Succinic acid

Methylsuccinic acid
α,α-Dimethylsuccinic acid
α,α'-Diethylsuccinic acid
Trimethylsuccinic acid
Tetramethylsuccinic acid
Monochlorosuccinic acid
Monofluorosuccinic acid
α,α'-Difluorosuccinic acid
α,α'-Dichlorosuccinic acid
Trifluorosuccinic acid
Tetrafluorosuccinic acid
α-Nitrosuccinic acid Maleic acid Dimethylmaleic acid
Itaconic acid
Citraconic acid
Aticonic acid
Methylitaconic acid
Chloromaleic acid or dichloromaleic acid 1,2-Cyclobutanedicarboxylic acid 3,4-Dichloro-1,2-cyclobutanedicarboxylic acid
3,4-Dibromo-1,2-cyclobutanedicarboxylic acid
1,2-Cyclopentanedicarboxylic acid
Methyl-1,2-cyclopentanedicarboxylic acids
1,2,4,5-Cyclopentanetetracarboxylic acid
Dihydrophthalic, tetrahydrophthalic or
Hexahydrophthalic acids
4-Methylhexahydrophthalic acid Polycyclic diacids, such as 2,3-Bicyclo[2,2,1]-heptanedicarboxylic acid
Bicyclo[3,2,2]non-6-ene-2,3-dione-8,9-dicarboxylic acid
Bicyclo[2,2,2]oct-5-ene-1,2-dicarboxylic acid
1,2-Bicyclo[2,2,2]octanedicarboxylic acid
Bicyclo[2,2,2]oct-7-en-2,3,5,6-tetracarboxylic acid
Tricyclo[4,2,2,0$^{2,5}$]deca-3,7-diene-9,10-dicarboxylic acid Phthalic acids Ortho-phthalic acid
3-Chlorphthalic acid
4-Chlorophthalic acid
3-Methoxyphthalic acid
3,5-Dimethoxyphthalic acid
3,6-Dimethylphthalic acid
4-Nitrophthalic acid
3,4,5,6-Tetrachlorophthalic acid
4-Carboxyphthalic acid
3,4,3',4'-Benzophenonetetracarboxylic acid The following heterocyclic acids 2,3,5-Furantricarboxylic acid
2,3-Benzofurandicarboxylic acid
3,4-Pyridinedicarboxylic acid Heterocyclic polycyclic diacids, such as 7-oxa-bicyclo[2,2,1]-5-heptene-2,3-dicarboxylic acid.

Among the various monoamines or polyamines which can be used to prepare the various accelerators, exemplary are: ammonia, hydrazine, aliphatic, alicyclic or aromaic primary monoamines, aliphatic or aromatic primary diamines, polyamines optionally containing heteroatoms, such as the polyamines of formula:

$$NH_2-[(CH_2)_{m'}-NH]_m-H \text{ or}$$
$$NH_2-[(CH_2)_{m'}-O]_{m-1}-(CH_2)_{m'}-NH_2,$$

with m' being an integer from 2 to 6.

By way of illustration, representative are, in particular: ammonia, butylamine, cyclohexylamine, hydrazine, aniline, chloroaniline, trifluormethylaniline, toluidine, xylidine, 4,4'-diaminodiphenylmethane, 4,4'-diaminodiphenyl ether, ethylenediamine, hexamethylenediamine, cyclohexylenediamine, and the like.

Lastly, also representative of the various accelerators which can be used according to the invention, are the compounds of formula (1), in which the various symbols correspond exactly to the substituents borne by the acid anhydride (or the diacid or polyacid anhydride) and the amine (or the diamine) which have been used to prepare them and which have been specifically named immediately above. Among these, notable are, for obvious purposes, the sodium, potassium and calcium salts of N,N'-polymethylenebisphthalamic, N,N'-polymethylenebishexahydrophthalamic, N,N'-polymethylenebissuccinamic and N,N'-polymethylenebismaleamic acids. The accelerator according to the invention, especially in its salt form, may contain water of formation in its molecule, in the form of a mono- or polyhydrated salt. This water of formation reduces the storage stability of the single-component compositions at ambient temperature, generally to less than a month.

While the invention is not to be considered as being limited to any theoretical explanation, it appears that when energy is supplied, especially heat, in the case of a free acid, the accelerator generates water by intramolecular dehydration in accordance with the reaction scheme:

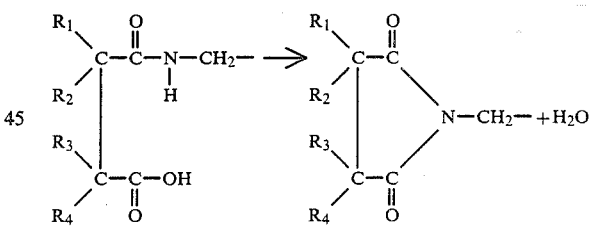

and, in the case of a salt, it generates the hydroxide of the corresponding metal cation M.

This water and/or this hydroxide formed hydrolyze the polyacyloxysilanes and thus accelerate the cross-linking of the organopolysiloxane composition. Furthermore, in the case where a hydroxide of the M cation is formed, such hydroxide neutralizes the acid produced by the hydrolysis of the polyacyloxysilane, generating water.

Consequently, in order to cross-link the organopolysiloxane compositions according to the invention, it suffices to supply energy to the said compositions, in a suitable form and quantity to generate the said water of dehydration and/or the said hydroxide of the M cation produced by the decomposition of the accelerator.

The composition according to the invention may additionally comprise from 1 to 150 parts of an inorganic filler (D) per 100 parts of component (A).

More specifically, the subject organopolysiloxane composition according to the invention is well adopted for cross-linking into an elastomer, and comprises:

100 parts of principally α,ω-dihydroxydiorganopolysiloxane polymers (A), having a viscosity of 700 to 1,000,000 mPa.s at 25° C., each comprising a plurality of recurring diorganosiloxy units of the formula $R_2SiO$, in which the symbols R, which are identical or different, denote hydrocarbon radicals containing from 1 to 8 carbon atoms, unsubstituted or substituted by halogen atoms or cyano groups, 2 to 20 parts of a cross-linking agent (B) of the general formula $R_pSi(OCOR')_{4-p}$, in which the symbol R has the meaning given under (A), the symbol R' denotes a hydrocarbon radical free from aliphatic unsaturation and containing from 1 to 15 carbon atoms, and the symbol p denotes zero or one, and 0.01 to 30 parts, preferably 0.5 to 15 parts, per 100 parts of (A)+(B)+(C), of a cure accelerator (C).

The polymers (A), having a viscosity of 700 to 1,000,000 mPa.s at 25° C., preferably 1,000 to 700,000 mPa.s at 25° C., are substantially linear polymers, comprising diorganosiloxy units of the above-mentioned formula $R_2SiO$, and blocked by a hydroxy group at each end of their polymer chain; however, the presence of monoorganosiloxy units of the formula $RSiO_{1.5}$ and/or siloxy units of formula $SiO_2$ is not excluded, in a proportion not exceeding 2% relative to the number of diorganosiloxy units.

The hydrocarbon radicals containing from 1 to 8 carbon atoms, unsubstituted or substituted by halogen atoms or cyano groups, and denoted by the symbols R, are advantageously selected from among:

Alkyl and haloalkyl radicals containing from 1 to 8 carbon atoms, such as methyl, ethyl, n-propyl, isopropyl, n-butyl, n-pentyl, n-hexyl, 2-ethylhexyl, n-octyl, 3,3,3-trifluoropropyl, 4,4,4-trifluorobutyl and 4,4,4,3,3-pentafluorobutyl radicals cycloalkyl and halocycloalkyl radicals containing from 4 to 8 carbon atoms, such as cyclopentyl, cyclohexyl, methylcyclohexyl, 2,3-difluorocyclobutyl and 3,4-difluoro-5-methylcycloheptyl radicals;

Alkenyl radicals containing from 2 to 4 carbon atoms such as vinyl, allyl and 2-butenyl radicals;

Aryl and haloaryl radicals containing from 6 to 8 carbon atoms, such as phenyl, tolyl, xylyl, chlorophenyl, dichlorophenyl and trichlorophenyl radicals;

Cyanoalkyl radicals in which the alkyl chains contain from 2 to 3 carbon atoms, such as β-cyanoethyl and γ-cyanopropyl radicals.

Exemplary of the recurring units of the formula $R_2SiO$, representative are those of the formulae:
$(CH_3)_2SiO$
$CH_3(CH_2=CH)SiO$
$CH_3(C_6H_5)SiO$
$(C_6H_5)_2SiO$
$CF_3CH_2CH_2(CH_3)SiO$
$NC-CH_2CH_2(CH_3)SiO$
$NC-CH(CH_3)CH_2(CH_2=CH)SiO$
$NC-CH_2CH_2CH_2(C_6H_5)SiO$ It will be appreciated that, in another embodiment of the invention, the polymers (A) which are used may be copolymers, or a mixture comprising α,ω-dihydroxydiorganopolysiloxane polymers which differ from each other in their molecular weight and/or the nature of the groups bonded to the silicon atoms.

These α,ω-dihydroxydiorganopolysiloxane copolymers (A) are available commercially; furthermore, they can easily be manufactured. One of the most widely used methods of manufacture includes, in a first stage, polymerizing diorganocyclopolysiloxanes by means of catalytic amounts of alkaline or acidic agents, and then treating the polymerizates with calculated amounts of water (French Pat. Nos. 1,134,005, 1,198,749 and 1,226,745); this addition of water, which is proportionately greater the lower the viscosity of the polymers to be prepared, may be wholly or partly replaced by α,ω-dihydroxydiorganopolysiloxane oils of low viscosity ranging, for example, from 5 to 200 mPa.s at 25° C., and having a high content of hydroxy radicals, for example, from 3 to 14%.

The cross-linking agents (B) are used in a proportion of 2 to 20 parts, preferably from 3 to 15 parts, per 100 parts of the α,ω-dihydroxydiorganopolysiloxane polymers (A).

They correspond to the above-mentioned formula $R_pSi(OCOR')_{4-p}$, in which, as above indicated, the symbol R has the meaning given under (A), the symbol R' denotes a hydrocarbon radical free of aliphatic unsaturation and containing from 1 to 15 carbon atoms, and the symbol p denotes zero or 1.

Detailed information has already been given concerning the nature of the radicals denoted by the symbol R. As for the symbol R', this denotes a radical selected from among:

Alkyl radicals containing from 1 to 15 carbon atoms, such as methyl, ethyl, n-propyl, n-butyl, n-pentyl, 1-ethylpentyl, n-hexyl, 2-ethylhexyl, n-octyl, neodecyl, n-decyl, n-dodecyl and n-pentadecyl radicals;

Cycloalkyl radicals containing from 5 to 6 ring carbon atoms, such as cyclopentyl and cyclohexyl radicals; and Aryl radicals containing from 6 to 8 carbon atoms, such an phenyl, tolyl and xylyl radicals.

By way of specific examples of the cross-linking agents (B), representative are those corresponding to the following formulae:
$CH_3Si(OCOCH_3)_3$
$C_2H_5Si-(OCOCH_3)_3$
$CH_2=CHSi(OCOCH_3)_3$
$C_6H_5Si-(OCOCGH_3)_3$
$CH_3si[OCOCH(C_2H_5)(CH_2)_3-CH_3]_3$
$CF_3CH_2CH_2Si(OCOC_6H_5)_3$
$CH_3Si(OCOC_6H_5)_3$

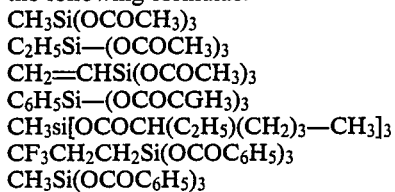

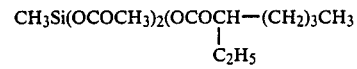

It is clear that in the compositions of the invention, the components (A) and (B) may be replaced by the devolatilized products produced by the stoichiometric reaction of (A) with (B) in accordance with the process described in French Pat. No. 1,220,348.

Silanes, each of which contains only two hydrolyzable groups, may be associated with these cross-linking agents (B); these silanes correspond to the formula:

$R''_2Si(OCOR')_2$ in which the symbols R' have the meaning of the symbol R' in the formula:

$$R_pSi(OCOR')_{4-p}$$

and the symbols R" have the meaning of the symbol R of this same formula, or denote a tert-butoxy radical of formula $(CH_3)_3C-O-$.

By way of specific examples of such silanes, representative are those of the following formulae:
$(CH_3)_2(OCOCH_3)_2$
$CH_2=CH(CH_3)Si(OCOCH_3)_2$
$(C_6H_5)_2Si(OCOCH_3)_2$
$[(CH_3)_3C-P]_2Si(OCOCH_3)_2$
$(CH_3)_2Si[OCOCH(C_2H_5)(CH_2)_3CH_3]_2$
$[(CH_3)_3CO]_2Si[OCOCH(C_2H_5)(CH_2)_3CH_3]_2$ The molar quantity of the silanes of the formula:

$$R"_2Si(OCOR')_2$$

which is used relative to that of the cross-linking silanes (B) of the formula:

$$R_pSi(OCOR')_{4-p}$$

which is used, is not strictly defined, but it must have an upper limit, such that the mixture of the two types of silanes always contains, on average, at least 2.5 —O-COR' groups per silicon atom.

Thus, considering, for example, 1 mole of the cross-linking silane (B) of the formula $RSi(OCOR')_3$ (with p=1), this had to be combined with not more than 1 mole of the silane $R"_2Si(OCOR')_2$; similarly, taking 1 mole of the crosslinking silane (B) of the formula $Si(OCOR')_4$ (with p=0), this must be combined with not more than 3 moles of silane $R"_2Si(OCOR')_2$.

The principal function of the silanes of formula $R"_2Si(OCOR')_2$ is to link the chains of the α,ω-dihydroxydiorganopolysiloxane polymers (A), thus making it possible to obtain elastomers having good physical properties from compositions containing polymers (A) whose viscosity is relatively low, ranging, for example, from 700 to 5,000 mPa.s at 25° C.

The compositions according to the invention may additionally contain from 1 to 150 parts, preferably 5 to 120 parts, per 100 parts of the α,ω-dihydroxydiorganopolysiloxane polymers (A), of inorganic fillers (D). These fillers may be in the form of very finely divided materials whose mean particle diameter is less than 0.1 μm. These fillers (D) include pyrogenic silicas and precipitated silicas; their specific surface is generally greater than 40 m²/g, and in most cases is in the range of 150-200 m²/g.

Aside from the components (A), (B), (C) and (D), the organopolysiloxane compositions according to the invention may additionally, but not necessarily, contain cure catalysts which are typically selected from among:

Metal salts of carboxylic acids, preferably organotin salts of carboxylic acids, such as dibutyltin diacetate and dilaurate;

Products of reaction of organotin salts of carboxylic acids with titanic esters (U.S. Pat. No. 3,409,753); and Organic titanium and zirconium derivatives, such as titanic and zirconic esters (published French Application No. 82/13,505, filed July 30, 1982).

These cure catalysts are usually employed in a proportion of 0.0004 to 6 parts, preferably from 0.0008 to 5 parts, per 100 parts of α,ω-dihydroxydiorganopolysiloxane polymers (A).

The organopolysiloxane compositions may also comprise conventional adjuvants and additives, especially heat stabilizers. These latter materials, whose presence improves the heat resistance of the silicone elastomers, may be selected from among rare-earth salts, oxides and hydroxides, (and especially from ceric oxides and hydroxides) or from titanium and iron oxides, preferably produced by combustion.

Other than the principal components (A), (B), (C) and (D), and the above-mentioned additives, individual organopolysiloxane compounds may be added in order to modify the physical characteristics of the compositions according to the invention and/or the mechanical properties of the elastomers produced by curing these compositions.

These organopolysiloxane compounds are well known; they comprise, more particularly:

(1f) The following polymers:
α,ω-bis(triorganosiloxy)diorganopolysiloxanes and/or α-hydroxy-ω-triorganosiloxydiorganopolysiloxane, having viscosities of at least 10 mPa.s at 25° C., consisting essentially of diorganosiloxy units and at most 1% of monoorganosiloxy and/or siloxy units, the organic radicals bonded to the silicon atoms being selected from among methyl, vinyl and phenyl radicals, at least 60% of these organic radicals being methyl radicals and not more than 10% being vinyl radicals. The viscosity of these polymers may reach several tens of millions of mPa.s at 25° C.; consequently, they range from mobile to viscous oils and from soft to hard resins. They are prepared according to conventional methods, described in greater detail in French Pat. Nos. 978,058, 1,025,150, 1,108,764 and 1,370,884. It is preferable to use α,ω-bis(-trimethyl-siloxy)dimethylpolysiloxane oils having a viscosity ranging from 10 mPa.s to 1000 mPa.s at 25° C. These polymers, which act as plasticizers, may be added in a proportion not exceeding 150 parts, preferably from 5 to 120 parts, per 100 parts of the α,ω-dihydroxydiorganopolysiloxane polymers (A).

(2f) Branched, liquid methylpolysiloxane polymers containing from 1.4 to 1.9 methyl radicals per silicon atom and comprising a combination of units of the formulae:
$(CH_3)_3SiO_{0.5}$
$(CH_3)_2SiO$ and
$CH_3SiO_{1.5}$;
they contain from 0.1 to 8% of hydroxyl groups. They may be prepared by hydrolysis of the corresponding chlorosilanes, as taught by French Pat. Nos. 1,408,662 and 2,429,811. Preferably used are branched polymers in which the units are distributed in accordance with the following relationships:
$(CH_3)_3SiO_{0.5}/(CH_3)_2SiO = 0.01$ to $0.15$
and $CH_3SiO_{1.5}/(CH_3)_2SiO = 0.1$ to $1.5$
The polymers may be added in a proportion not exceeding 70 parts, preferably from 3 to 50 parts, per 100 parts of the α,ω-dihydroxydiorganopolysiloxane polymers (A). They confer thixotropic properties, especially with treated silicas.

(3f) Diorganopolysiloxane oils blocked by hydroxyl and/or lower alkoxy groups containing from 1 to 4 carbon atoms, having a low viscosity which generally is in the range of 2 mPa.s to 4,000 mPa.s at 25° C. (when these oils are blocked solely by hydroxyl groups, their viscosity is less than 700 mPa.s at 25° C.); the organic radicals bonded to the silicon atoms in these oils are, as aforesaid, selected from among methyl, vinyl and phenyl radicals, at least 40% of these radicals being methyl radicals and not more than 10% being vinyl radicals.

Exemplary of the chain-blocking lower alkoxy groups, representative are methoxy, ethoxy, isopropoxy, n-propoxy, n-butoxy, isobutoxy and tert-butoxy groups. The concentrations of hydroxyl and/or alkoxy groups are generally between 0.5 and 20%. These oils are prepared according to conventional techniques which are described in greater detail in French Pat. Nos. 938,292, 1,104,674, 1,116,196, 1,278,281 and 1,276,619. Preferably used are α,ω-dihydroxydimethylpolysiloxane oils having a viscosity of 10 to 300 mPa.s at 25° C., α,ω-dihydroxymethylphenylpolysiloxane oils having a viscosity of 200 to 600 mPa.s at 25° C. and α,ω-dimethoxy-(or diethoxy-) dimethylpolysiloxane oils having a viscosity of 30 to 2,000 mPa.s at 25° C. They may be added in a proportion not exceeding 50 parts, preferably from 2 to 40 parts, per 100 parts of the α,ω-dihydroxydiorganopolysiloxane polymers (A). These oils make it possible to reduce the overall viscosity and are considered as "process aids", according to conventional terms.

(4f) Hydroxylated organosilicon compounds selected from among compounds corresponding to the general formula:

which are solid at ambient temperature. In this formula, the symbols Z, which are identical or different, denote methyl, ethyl, n-propyl, vinyl or phenyl radicals; the symbol Z' denotes a hydroxy radical or Z, and the symbol w denotes zero, 1 or 2. Exemplary of these compounds, representative are: diphenylsilanediol, methylphenylsilanediol, dimethylphenylsilanol, 1,1,3,3-tetramethyldisiloxanediol, 1,3-dimethyl-1,3-diphenyldisiloxanediol and 1,1,5,5-tetramethyl-3,3-diphenyldisiloxanediol. They may be added in a proportion not exceeding 30 parts, preferably 0.5 to 20 parts, per 100 parts of the α,ω-dihydroxydiorganopolysiloxane polymers (A). They confer properties which induce thixotropy in the mixture, which generally gels slightly under their effect. The α,ω-bis(triorganosiloxy)diorganopolysiloxane and/or α-hydroxy-ω-triorganosiloxydiorganopolysiloxane polymers descried under (1f) may be wholly or partially replaced by organic compounds which are inert towards the components (A), (B), (C) and (D) and which are miscible at least with the α,ω-dihydroxytriorganopolysiloxane polymers (A). As examples of these organic compounds, representative are the polyalkylbenzenes produced by alkylating benzene by means of longchain olefins, especially olefins containing 12 carbon atoms, produced by the polymerization of propylene. Organic compounds of this type appear, for example, in French Pat. Nos. 2,392,476 and 2,446,849.

If appropriate, the compositions according to the invention may be used after being diluted with liquid organic compounds; the diluents are preferably conventional materials which are commercially available, and which are selected from among:

Aliphatic, alicyclic, or aromatic hydrocarbons, halogenated or unhalogenated, such as n-heptane, n-octane, cyclohexane, methylcyclohexane, toluene, xylene, mesitylene, cumene, tetralin, perchloroethylene, trichloroethane, tetrachloroethane, chlorobenzene and ortho-dichlorobenzene;

Aliphatic and alicyclic ketones such as methyl ethyl ketone, methyl isobutyl ketone, cyclohexanone and isophorone;

Esters such as ethyl acetate, butyl acetate and ethoxyethanol acetate.

The preparation of the single-components can also be carried out in a single step or in two steps. According to this latter technique, which defines another object of the present invention, the compositions are first prepared by mixing the components (A), (B) and (D) and, if appropriate, the conventional additives and adjuvants, in the absence of moisture. They are stable during storage and cure only when exposed to moist air. It is quite obvious that such compositions could, where applicable, be used by themselves and that their curing or cross-linking would then progress from the surfaces in contact with the surrounding air and would gradually continue inwards towards the center of the mass. The time required to cure them completely would be relatively long, and would principally depend on the thickness of the deposited layers and on the degree of humidity in the atmosphere surrounding the compositions. A period of 24 hours would thus be generally required at ambient temperature, with a relatively humidity of 60%, to properly cross-link a layer 4 mm thick.

These compositions form the first component of a twocomponent composition according to the invention, the second component consisting of the accelerator (C).

When a single-component composition is to be prepared, the cure accelerators (C) are added to this first component in a second step and are homogenized, the operation being carried out in the absence of air at ambient temperature.

In this manner, single-component compositions are obtained, whose stability at ambient temperature and in the absence of atmospheric moisture may range up to several months or even longer than a year, depending on the nature of the accelerator, the accelerator content and the storage temperature. Storage temperatures of less than 40° C., preferably less than 25° C., are preferred.

To effect, or accelerate, the cure of these compositions, it is generally sufficient to subject them to a heat treatment at a temperature above 60° C., preferably from 80° to 250° C., and still more preferably from 90° to 200° C.

When accelerated in this fashion, the compositions according to the invention should be used quickly because, in contrast to the conventional single-component compositions, their cure proceeds throughout the mass. The time required for their complete cure is very variable, since it depends upon the nature and the amounts of the accelerators (C) which are used, upon the temperature of the heat treatment and upon its duration.

Cure times ranging from a few minutes to 60 minutes or above may be obtained by modifying the various parameters. The temperature is an important parameter; in fact, changes in the temperature level have a very marked effect on the rate of curing. If the temperature increases (the variations are positive), the cure time is reduced; in the opposite case, the time is increased.

The present invention naturally also envisages the two-component compositions in which the accelerator (C) is stored separately from (A), (B) and (D) and from the conventional additives or adjuvants. Such an arrangement can be advantageous in applications where the content of the accelerator needs to be continually adjusted.

Another object of the invention features the use of the quick-curing compositions to produce seals.

The compositions according to the invention may be used for many applications, such as sealing in the building industry, the assembly of a wide variety of materials (metals, plastics, natural and synthetic rubbers, wood, cardboard, porcelain, brick, ceramic, glass, stone, concrete, masonry components), insulating electrical conductors, coating electronic circuits, and preparing molds used to manufacture articles made of synthetic resins or foams.

In addition, they are also especially suitable for the formation of "in situ" seals used in the automotive industry. These "in situ" seals include a number of types, namely, "squashed" seals, "shaped" seals and "injected" seals.

The "squashed" seals are formed as a result of the application of a pasty bead of the compositions to the area of contact between two metal components to be assembled. The pasty bead is first deposited onto one of the components and then the other component is immediately applied to the first; as a result, the bead is squashed before it is converted to an elastomer. Seals of this type are intended for assemblies which are not to be regularly dismantled (oil sump seals, timing case seals, etc.).

"Shaped" seals are also obtained as a result of the application of a pasty bead of the compositions to the area of contact between two components to be assembled. However, after the pasty bead has been deposited onto one of the components, a complete cure of the bead to an elastomer is produced, for example by heating, and only then is the second component applied to the first. As a result of this, such an assembly can be readily dismantled, because the component which is applied to that which has received the seal does not adhere to this seal. Furthermore, because of its rubbery nature, the seal matches all the irregularities of the surfaces to be joined together and, consequently, there is no need (1) to carefully machine the metal surfaces which are to be placed in contact with each other and (2) to clamp tightly the assemblies which are produced; these special characteristics make it possible to eliminate, to some extent, gaskets, spacers and ribs which are usually intended to stiffen and reinforce the components of the assemblies.

Since the compositions according to the invention can cure rapidly in the presence or in the absence of moisture, in a confined environment or in the open air, as a result, the "shaped" seals (and also the other "in situ" seals) resulting from the curing of these compositions may be produced under highly restrictive conditions. For example, they can be produced on conventional assembly lines in the automotive industry, which are equipped with automatic apparatus for deposition of the compositions. This automatic apparatus may have a mixer head for the two-component compositions, which is equipped with an applicator nozzle, the latter being moved such as to trace the outline of the seals to be manufactured. The mixer head may receive the polysiloxane composition comprising the accelerator, and it may also be provided with a third entry permitting the introduction of a solvent used to flush the equipment after use (cyclohexane, etc.). The cross-linking of the deposited bead or seal can then be effected by heating it in an appropriate manner.

The compositions produced and distributed by means of this apparatus must have a cure time which is properly adjusted in order, on the one hand, to avoid setting solid in the mixer head and, on the other hand, to produce complete cross-linking when the deposition of the pasty bead on the components to be jointed together is finished. In accordance with the invention, this setting into solid state can be avoided in the case of the single-component compositions, for which the mixer head and the extrusion nozzle are maintained at ambient temperature. These "shaped" seals are especially suitable for sealing rocker covers, gearbox covers, timing spacers and even oil sumps.

The injected seals, whose cross-linking has been effected thermally beforehand, are formed in a confined environment, in cavities which are frequently completely closed; the composition placed in these cavities are quickly converted into elastomers whose properties are identical to those of elastomers produced by curing the compositions in open air. These seals can be used, for example, for sealing crankshaft bearings.

The compositions according to the invention are also suitable for the production of quick-curing seals in applications other than in the automotive industry. Thus, they can be used to bond and to seal plastic electrical housings, and to produce seals for vacuum cleaners and for steam irons.

The elastomers produced by curing the compositions according to the invention have mechanical properties which are substantially identical to those of the elastomers produced from known single-component compositions, and thus produced by merely mixing the components (A), (B), (D) and, is appropriate, conventional additives, without the addition of the accelerators (C). In particular, the residual compression set (RCS) can be relatively low, on the order, for example, of 8 to 35%. The RCS test consists of heating, for several hours (for example at 150° C.), an elastomer specimen which is maintained under a compression which reduces its height by 30%, and in measuring the residual set by measuring, as a percentage, the decrease in specimen size after the test. In addition, the complete cross-linking, measured as the Shore A hardness, is obtained immediately upon completion of the cross-linking times referred to above, which usually range from a few minutes to 60 minutes, sometimes longer, but never more than 3 hours. In the case of the single-component compositions, at least about ten hours are required for complete cross-linking under the most favorable conditions.

In order to further illustrate the present invention and the advantages thereof, the following specific examples are given, it being understood that same are intended only as illustrative and in nowise limitative.

EXAMPLE 1

A composition $G_1$, which cured into an elastomer in the presence of atmospheric moisture at room temperature and above, was prepared by mixing the following components:

(i) 178 g: $\alpha,\omega$-Dihydroxypolydimethylsiloxane oil having a viscosity of 20,000 mPa.s at 25° C., (ii) 534 g: $\alpha,\omega$-Dihydroxypolydimethylsiloxane oil having a viscosity of 3,500 mPa.s at 25° C., (iii) 93 g: Pyrogenic silica having a BET specific surface of 300 m$^2$/g, treated with octamethylcyclotetrasiloxane, (iv) 170 g: Ground quartz having a mean particle diameter of 5 m, and (v) 25 g: Methyltriacetoxysilane.

90 g of N,N'-ethylenebismaleamic acid (vi), of the formula:

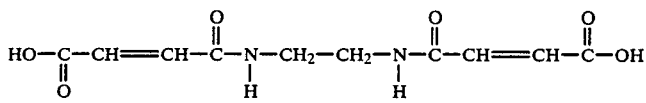

were added under dry nitrogen.

The composition $H_1$ (obtained in this manner) containing the accelerator, and stored at ambient temperature (20° C.) in a sealed tube, was stable for at least 6 months, as long as it did not come into contact with atmospheric moisture.

Specimens 4 mm in thickness were produced using $H_1$ on polyethylene plaques, which were placed for 2 hours in an oven heated to 150° C. The specimen was completely cross-linked and had a maximum Shore A hardness of 40.

EXAMPLE 2

To 1,000 g of $G_1$, prepared in accordance with Example 1, 130 g of N,N'-ethylenebissuccinamic acid of the formula:

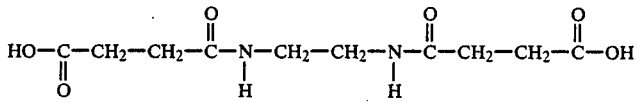

were added, to produce a composition $H_2$ which was stable for at least 6 months at ambient temperatures when stored in a closed tube. Specimens 4 mm thickness were cross-linked after being placed for 15 min in an oven at 100° C. The elastomer obtained container air bubbles which did not appear when the composition $H_2$ was cross-linked in the form of a coating 1 mm in thickness.

EXAMPLE 3

10 g of a mixture $F_3$ consisting of:
(i) 32 parts of the monohydrated calcium salt of N,N'-ethylenebissuccinamic acid, preliminarily dried at 40° C. under a vacuum of 4 mbar (with a residual water of formation content of 6.5%, as determined by the Karl Fischer method), having the formula:

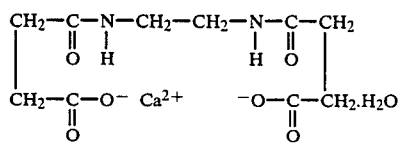

and,
(ii) 100 parts of an α,ω-bis(trimethylsiloxy)polydimethylsiloxane, having a viscosity of 30,000 mPa.s at 25° C. were added to 100 g of composition $G_1$, prepared in Example 1.

This produced a composition $H_3$, which was stable for approximately 3 weeks at ambient temperature in the absence of moisture.

4 mm specimens, placed at 150° C. for 5 min, cross-linked to a Shore A hardness of 40, although the temperature measured with a thermocouple within a specimen was only 120°–130° C. after 5 min, in an oven at 150° C.

An RCS of 20% was measured after 3 days at 150° C. on specimens under a compression of 30%.

EXAMPLE 4

The same accelerator as in Example 3 was used, except that the calcium salt was dried under a vacuum of 1.5 mbar for 15 hours at 60°14 65° C. The accelerator molecule no longer contained virtually any water of formation (residual water content of 1.4% by the Karl Fischer method).

4.8 g of the calcium salt were added under dry nitrogen to 100 g of composition $G_1$, prepared in Example 1, and the composition $H_4$ thus obtained was placed in airtight closed tubes.

No cross-linking was observed in these tubes after more than 6 months of storage at ambient temperature. When the composition $H_4$ in these tubes was extruded to produce plaques 4 mm in thickness, a homogeneous, bubble-free cross-linking was obtained. A cross-linked product was obtained after a period of 5 to 10 min in an oven at 150° C.; but a final maximum hardness (Shore A hardness of 40) was obtained after only 30 minutes od exposure at 150° C.

EXAMPLE 5

The following paste $I_1$ was prepared:
(i) 92 g of polydimethylsiloxane having a viscosity of approximately $10^6$ mPa.s at 20° C.,
(ii) 8 g of α,ω-bis(trimethylsiloxy)polydimethylsiloxane,
(iii) 3 g of pyrogenic silica having a BET specific surface of 200 m$^2$/g,
(iv) 5 g of water, and
(v) 4.3 g of titanium oxide.

The following composition $F_5$ was then prepared:
(1) 14 g of α,ω-bis(trimethylsiloxy)polydimethylsiloxane oil having a viscosity of 30,000 mPa.s at 25° C.,
(2) 4.8 g of the calcium salt used in Example 4, and
(3) 0.25 g of paste $I_1$.

All of the composition $F_5$ was added under dry nitrogen to 100 g of composition $G_1$ prepared in Example 1, to produce a composition $H_5$.

The composition $H_5$ was extruded rapidly to produce specimens 4 mm in thickness, and the composition cross-linked after 5 min in an oven at 150° C. (Shore A hardness 25).

The final maximum hardness (Shore A hardness=40) was obtained after 10 to 15 minutes of exposure at 150° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition of matter curable into elastomeric state, comprising a polyhydroxylated polysiloxane (A), a polyacyloxysilane cross-linking agent (B) therefor, and an effective amount of at least one 2-carboxycarboxamide cure autoaccelerator (C).

2. The organopolysiloxane composition as defined by claim 1, said at least one 2-carboxycarboxamide cure autoaccelerator (C) having the formula (I):

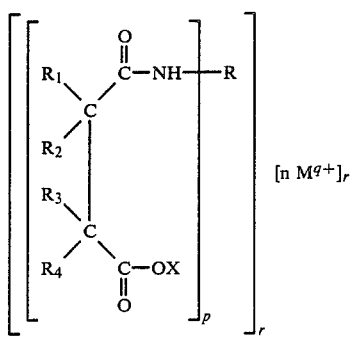

wherein $R_1$, $R_2$, $R_3$ and $R_4$ are each a hydrogen atom, a halogen atom, an alkyl or haloalkyl, alkoxy, alkoxycarbonyl, hydroxyl, carbamoyl or carboxamide radical, with the proviso that at least one of $R_1$ together with $R_3$, $R_1$ together with $R_4$, $R_2$ together with $R_3$ or $R_2$ together with $R_4$ may form a valence bond and/or a divalent radical (L) including the two carbon atoms to which $R_1$, or $R_2$, and $R_3$, or $R_4$, are attached, said radical (L) being cyclic or polycyclic, or comprising a plurality of cyclic members joined together by a valence bond, a heteroatom, or a methylene or carboxyl group;

r is an integer equal to 1 or 2;

p is an integer equal to 1 or 2 and corresponding to the valency of the symbol R;

R is a valence bond or:

(a) a hydrogen atom; a —CONHR$_5$ or —CSNHR$_5$ group, with R$_5$ being a hydrogen atom or an alkyl radical; an aliphatic or saturated or unsaturated alicyclic radical; an aromatic radical; or alkyl substituted each group or radical, said alkyl substituent either being unsubstituted or bearing at least one halogen atom, carboxyl, nitro, urea, thiourea or hydroxy substituent; or (b) a divalent alkylene, cycloalkylene or phenylene radical, or a plurality of alkylene or phenylene groups bonded together by a heteroatom or a

group, wherein R$_5$ is as above defined;

M is a cation of valency q;

n is an integer equal to 0, 1 or 2, with the further proviso that the overall ionic charge of the accelerator is zero according to the equation $n \times q = p$ when $n = 0$; X is hydrogen and, when n is other than 0, X is a negative charge.

3. The organopolysiloxane composition as defined by claim 2, said at least one cure autoaccelerator (C) comprising a plurality of 2-carboxycarboxamide functional groups.

4. The organopolysiloxane composition as defined by claim 2, said at least one 2-carboxycarboxamide cure autoaccelerator (C) comprising a derivative of phthalamic, maleamic, succinamic, or polyhydrophthalic acid.

5. The organopolysiloxane composition as defined by claim 2, wherein said at least one cure autoaccelerator (C), M comprises calcium, lithium, barium or strontium.

6. The organopolysiloxane composition as defined by claim 2, wherein said at least one cure autoaccelerator (C) comprises the mono- or polyhydrate thereof.

7. The organopolysiloxane composition as defined by claim 1, further comprising a catalytically effective amount of a curing catalyst.

8. The organopolysiloxane composition as defined by claim 1, further comprising a liquid organic diluent therefor.

9. The organopolysiloxane composition as defined by claim 2, said at least one 2-carboxycarboxamide cure autoaccelerator (C) having the formula:

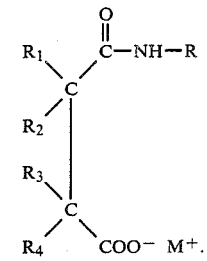

10. The organopolysiloxane composition as defined by claim 2, said at least one 2-carboxycarboxamide cure autoaccelerator (C) having the formula:

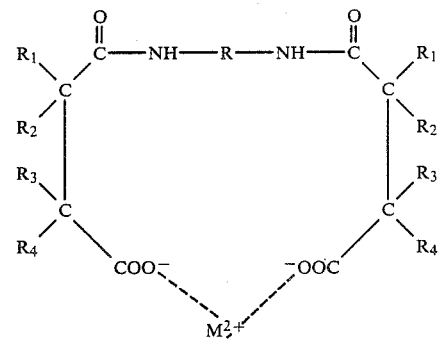

11. The organopolysiloxane composition as defined by claim 2, said at least one 2-carboxycarboxamide cure autoaccelerator (C) having the formula:

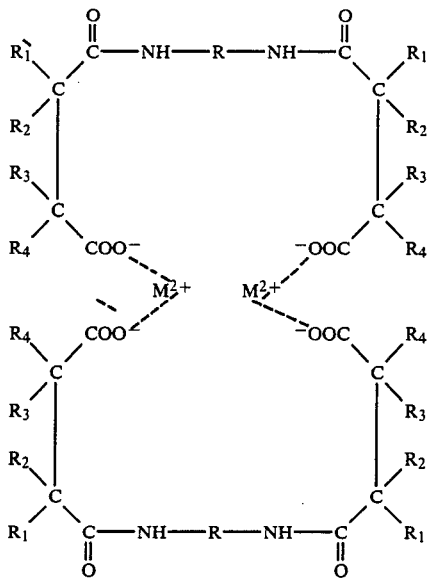

12. The organopolysiloxane composition as defined by claim 1, which comprises:
(i) 100 parts of α,ω-dihydroxydiorganopolysiloxane polymer (A) having a viscosity of 700 to 1,000,000 mPa.s at 25° C., comprising a plurality of diorganosiloxy recurring units of the formula $R_2SiO$, in which the symbols R, which are identical or different, are each hydrocarbon radicals containing from 1 to 8 carbon atoms, unsubstituted or substituted by halogen atoms or cyano groups;
(ii) 2 to 20 parts of the cross-linking agent (B) of the general formula $R_pSi(OCOR')_{4-p}$, in which R is as above defined, the symbol R' is a hydrocarbon radical free from aliphatic unsaturation and containing from 1 to 15 carbon atoms, and the symbol p denotes zero or one; and
(iii) 0.01 to 30 parts, per 100 parts of (A)+(B)+(C), of the cure autoaccelerator (C).

13. The organopolysiloxane composition as defined by claim 12, further comprising from 1 to 150 parts of an inorganic filler (D) per 100 parts of said polyhydroxylated polysiloxane (A).

14. The organopolysiloxane composition as defined by claim 2, said at least one 2-carboxycarboxamide cure autoaccelerator (C) comprising N,N'-ethylenebismaleamic acid or salt thereof.

15. The organopolysiloxane composition as defined by claim 2, said at least one 2-carboxycarboxamide cure autoaccelerator (C) comprising N,N'-ethylenebissuccinamic acid or salt thereof.

16. The organopolysiloxane composition as defined by claim 1, said polyhydroxylated polysiloxane (A) and polyacyloxysilane (B) comprising the devolatilized reaction product thereof.

17. The organopolysiloxane composition as defined by claim 1, in single-component form.

18. The organopolysiloxane composition as defined by claim 1, in two-component form.

* * * * *